US009648016B2

(12) United States Patent
Gottschlich et al.

(10) Patent No.: US 9,648,016 B2
(45) Date of Patent: May 9, 2017

(54) PREDICTIVE INFORMATION TRANSMISSION

(71) Applicant: Raytheon Company, Waltham, MA (US)

(72) Inventors: Susan N. Gottschlich, Marlborough, MA (US); Raimund Merkert, Ayer, MA (US)

(73) Assignee: Raytheon Company, Waltham, MA (US)

( * ) Notice: Subject to any disclaimer, the term of this patent is extended or adjusted under 35 U.S.C. 154(b) by 283 days.

(21) Appl. No.: 14/161,182

(22) Filed: Jan. 22, 2014

(65) Prior Publication Data

US 2014/0207709 A1    Jul. 24, 2014

Related U.S. Application Data

(60) Provisional application No. 61/755,211, filed on Jan. 22, 2013.

(51) Int. Cl.
| | | |
|---|---|---|
| *G06F 17/00* | (2006.01) | |
| *H04L 29/06* | (2006.01) | |
| *H04W 64/00* | (2009.01) | |
| *H04W 4/02* | (2009.01) | |

(52) U.S. Cl.
CPC ...... *H04L 63/0876* (2013.01); *H04L 63/0428* (2013.01); *H04W 4/02* (2013.01); *H04W 64/006* (2013.01); *H04W 4/021* (2013.01); *H04W 4/027* (2013.01); *H04W 4/028* (2013.01)

(58) Field of Classification Search
None
See application file for complete search history.

(56) References Cited

U.S. PATENT DOCUMENTS

| | | | | |
|---|---|---|---|---|
| 7,123,169 | B2 * | 10/2006 | Farmer | G01S 7/003 340/945 |
| 7,343,165 | B2 * | 3/2008 | Obradovich | H04W 4/02 455/456.1 |
| 7,486,229 | B1 * | 2/2009 | Govoni | G01S 7/4004 342/160 |

(Continued)

FOREIGN PATENT DOCUMENTS

WO    WO-2014/116691 A2    7/2014

OTHER PUBLICATIONS

"International Application Serial No. PCT/US2014/012531, International Search Report mailed Jul. 28, 2014", 3 pgs.

(Continued)

*Primary Examiner* — Kakali Chaki
*Assistant Examiner* — Viker Lamardo
(74) *Attorney, Agent, or Firm* — Schwegman Lundberg & Woessner, P.A.

(57) ABSTRACT

Embodiments of a system and methods for predictive transmission of information are generally described herein. In some embodiments, a system includes a ground moving target indicator (GMTI) tracker module receives a current position estimate from a user equipment and to generate position and/or velocity estimates. A database system, including a mission/role database and user information database, receives the position and/or velocity estimates and transmits user information to the user equipment based on a predicted position of the user and the mission/role of a user.

12 Claims, 4 Drawing Sheets

(56) References Cited

U.S. PATENT DOCUMENTS

| | | | | |
|---|---|---|---|---|
| 7,693,906 B1* | 4/2010 | Amidon | G06F 17/30038 | 707/749 |
| 7,894,512 B2* | 2/2011 | Beadle | G01S 5/0294 | 375/224 |
| 8,291,069 B1* | 10/2012 | Phillips | G06F 17/18 | 375/341 |
| 8,633,970 B1* | 1/2014 | Mercay | G06T 19/006 | 345/633 |
| 9,122,702 B2* | 9/2015 | Biswas | G06F 17/30241 | |
| 2006/0109161 A1* | 5/2006 | Krikorian | G01S 13/90 | 342/25 B |
| 2006/0253254 A1* | 11/2006 | Herwitz | G01S 13/86 | 701/301 |
| 2006/0291657 A1* | 12/2006 | Benson | G05B 13/0275 | 380/270 |
| 2009/0087029 A1* | 4/2009 | Coleman | G06K 9/00208 | 382/103 |
| 2010/0157056 A1* | 6/2010 | Zohar | G01S 3/7864 | 348/144 |
| 2010/0208941 A1* | 8/2010 | Broaddus | G01S 3/7864 | 382/103 |
| 2011/0040764 A1* | 2/2011 | Duchon | G06Q 10/04 | 707/738 |
| 2011/0060808 A1* | 3/2011 | Martin | G06F 17/3087 | 709/217 |
| 2012/0194666 A1* | 8/2012 | Jackson | B64F 5/0045 | 348/123 |
| 2012/0200433 A1* | 8/2012 | Glover | G08G 5/065 | 340/971 |
| 2013/0093625 A1* | 4/2013 | Smith | G01S 5/0081 | 342/387 |
| 2014/0009324 A1* | 1/2014 | Ranney | G01S 13/534 | 342/161 |
| 2014/0109184 A1* | 4/2014 | Parker, II | H04W 12/06 | 726/3 |

OTHER PUBLICATIONS

"International Application Serial No. PCT/US2014/012531, Written Opinion mailed Jul. 28, 2014", 4 pgs.

"International Application Serial No. PCT/US2014/012531, International Preliminary Report on Patentability mailed Jun. 6, 2015", 6 pgs.

* cited by examiner

PREDICTIVE INFORMATION TRANSMISSION

PRIORITY CLAIM

This application claims priority under 35 U.S.C. §119 to U.S. Provisional Patent Application Ser. No. 61/755,211, filed Jan. 22, 2013.

TECHNICAL FIELD

Embodiments pertain to predictive information transmission. Some embodiments relate to database mining and management.

BACKGROUND

Users of handheld electronic devices can use the devices to find information related to their current location. Specialized applications, such as mapping and/or social networking applications, can be executed by the electronic devices to find the information. This approach can suffer from multiple drawbacks including: the information found is specialized to that of the application, the information relies on the user having network connectivity and time to wait for device/server communications, and the information may take a number of user interactions in order to sort through and find and/or request specific desired details. There are general needs for providing predictive information to a user.

DESCRIPTION

Embodiments of the present invention combine multiple technologies to provide a dynamic, real-time information update to a user. The technologies can include: ground moving target tracking, content management system indexing and searching, and a streamlined user interface to present the desired information to users.

Figure 1:
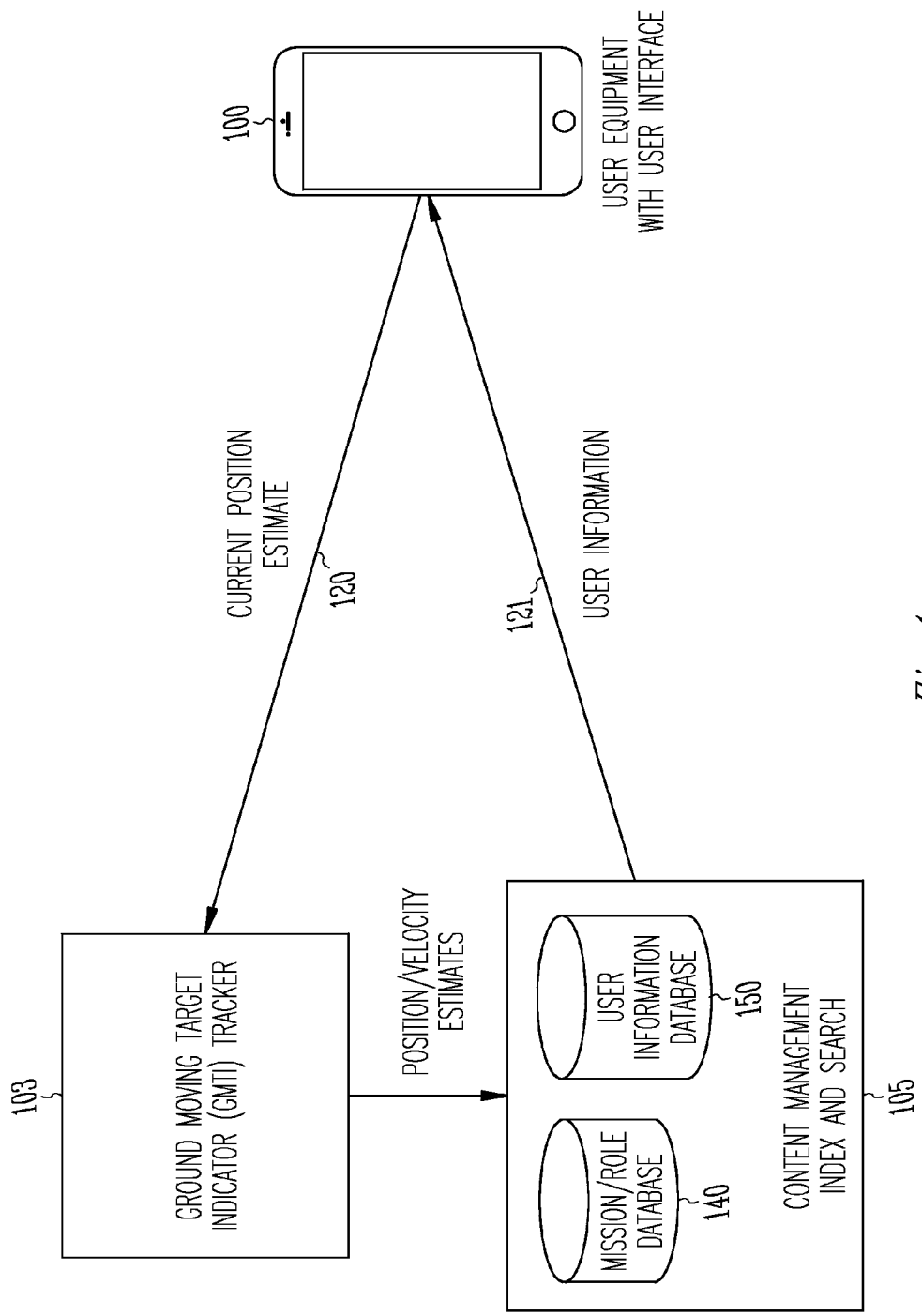
FIG. 1 illustrates a block diagram of a system that can transmit predictive information to a user.

FIG. 1 illustrates a block diagram of an embodiment of a system that can provide predictive information to a user. The system can include the user equipment 100, a ground moving target indicator (GMTI) tracker module 103 that receives location data from the user equipment 100, and a database system (e.g., a content management indexing and searching module) 105 that receives position/velocity predictions from the ground moving target indicator tracker module 103 and transmits information (e.g., encrypted and/or compressed) to the user equipment 100 based on predicted position, mission/role, as well as other criteria. The content management indexing and searching module 105 can comprise an encryption/compression module to encrypt and/or compress the user information.

The user equipment 100 can include a device for determining a geographic location of the user equipment 100. For example, the user equipment 100 can have a global positioning system (GPS) receiver or a module that can estimate its position based on receiving a signal from two or more fixed base stations (e.g., access points, cellular base stations).

Figure 2:
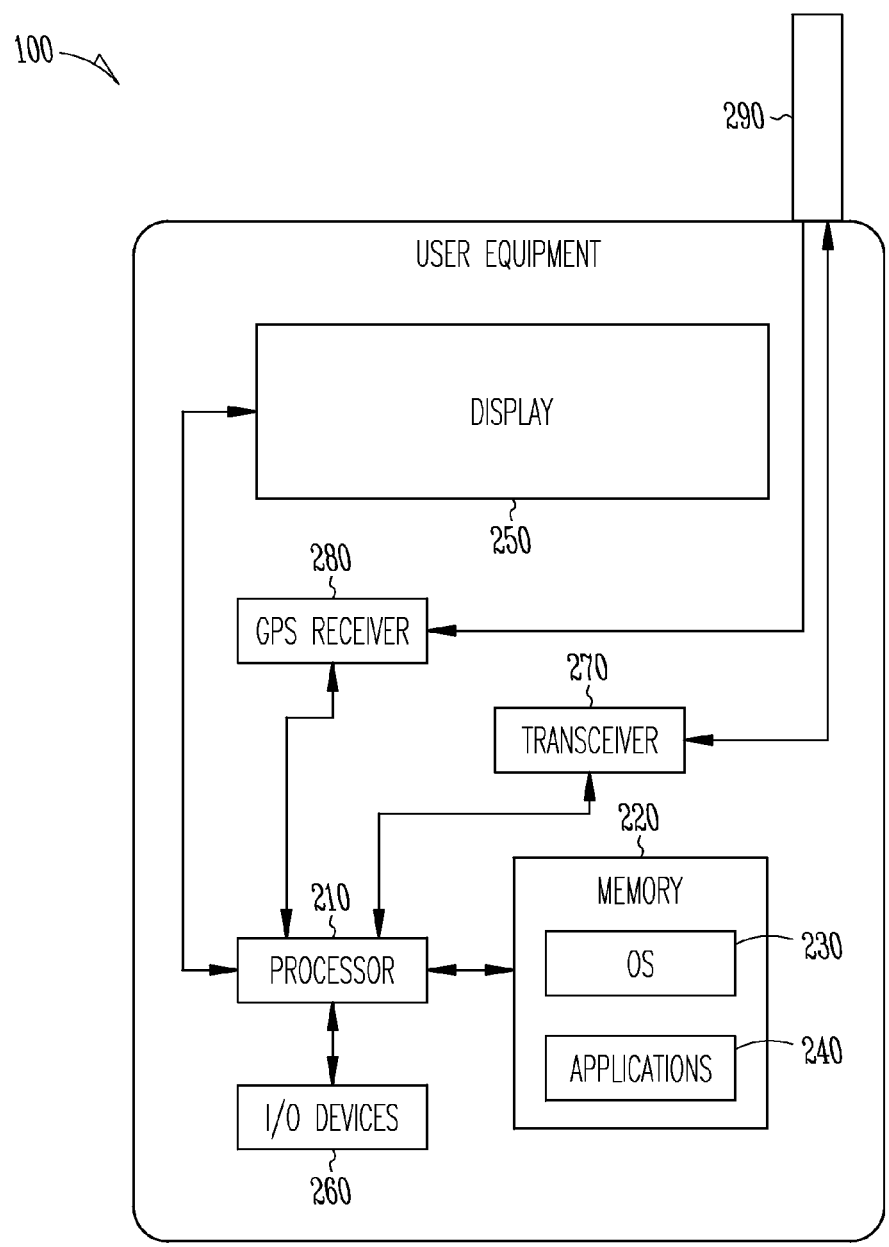
FIG. 2 illustrates a block diagram of an embodiment of user equipment.

FIG. 2 illustrates a block diagram of one embodiment of the user equipment. The user equipment 200 can include a processor 210. The processor 210 can be any of a variety of different types of commercially available processors. A memory 220, such as a Random Access Memory (RAM), a Read Only Memory (ROM), a Flash memory, or another type of memory, is typically accessible to the processor 210.

The memory 220 can be configured to store an operating system (OS) 230, as well as application programs 240. The OS 230 or application programs 240 can include instructions stored on a computer readable medium (e.g., memory 220) that can cause the processor 210 of the user equipment 200 to perform any one or more of the techniques discussed herein.

The processor 210 may be coupled, either directly or via appropriate intermediary hardware, to a display 250 and to one or more input/output (I/O) devices 260, such as a keypad, a touch panel sensor, a microphone, a speaker, etc. Similarly, in an example embodiment, the processor 210 can be coupled to a transceiver 270 that interfaces with an antenna 290. The transceiver 270 can be configured to both transmit and receive modulated radio signals, wireless data signals, or other types of signals via the antenna 290, depending on the nature of the user equipment 200.

A GPS receiver 280 can also make use of the antenna 290, to receive GPS signals, or a dedicated GPS antenna. The GPS receiver 280, using one or more GPS systems (e.g., Global Navigation Satellite System (GLONASS), GPS), can determine a geographical location for the user equipment that can be stored in the memory, transmitted to the system in a data packet, or otherwise used by the processor 210. As previously discussed, the geographical location can also be determined through triangulation with fixed base stations. This geographical location can also be stored in the memory, transmitted to the system in a data packet, or otherwise used by the processor 210.

User equipment 100 can be defined herein as any electronic device having communication capability (e.g., communication device). For example, user equipment can include mobile telephones, radios, tablet computers, laptop computers, or desktop computers. The user equipment can be either mobile or stationary and can include one or more displays and means for emitting an aural signal (e.g., speaker, headset). The user equipment can also be handheld or wearable by the user.

Referring again to FIG. 1, the ground moving target indicator tracker module 103 can be used to predict a user's future position trajectory based on the user's past and current locations, velocity, and acceleration trajectories. The past and current locations can be received from the user equipment 100 transmitting its location or an estimate of its location, based on GPS or some other location mechanism, in the form of one or more data packet(s) over a channel 120.

The past and current locations can also be estimated based on data stored in the content management system database (e.g., daily role/mission, scheduled role/mission). The ground moving target indicator tracking module 103 can provide predictions about the user's trajectory (i.e., future position) to the content management indexing and searching function 105.

The content management system indexing and searching module 105 can include a user mission/role database 140 as well as a user information database 150. This module 105 can receive the user's position and/or velocity from the ground moving target indicator tracking module 103.

User information can be sent from the content management indexing and searching module 105 to the user equipment 100 as a series of data packets over a channel 121. The data packets can be compressed and/or encrypted prior to transmission so that the data packets would need to be decompressed and/or decrypted prior to use by the user equipment.

A client application on the user equipment 100 can receive the data packets and determine whether to display the information, perform a text-to-speech conversion, and/or transmit an aural signal to the user (e.g., speaker, headset). The client can also determine if another application on the user equipment should be executed to either display the information or perform additional manipulation of the information in combination with other information (e.g., stored in user equipment memory).

The mission/role database 140 can contain a role of the user and, therefore, what information that the user can use. The mission/role database 140 can contain information regarding why the user is at the present location and/or why the user is traveling in the present direction. For example, the user's mission might include collecting intelligence information regarding particular people, events, and/or places of interest. This database 140 can also contain detailed personal information regarding the user (e.g., strengths, weaknesses, affiliations/organizations, skills).

The mission/role database 140 can also use the user's mission/role to determine how the user should receive desired information from the content management indexing and search module 105. For example, if the user is in (or predicted to be in) a situation where the user cannot read the transmitted information, it can be transmitted using a voice connection and/or a command sent to the client application of the user equipment 100 to perform a text-to-speech conversion. If the content management indexing and searching module 105 indicates that the user is going to be in a situation (e.g., combat or intelligence gathering role) where voice reception can give away the user's location, the information can be transmitted using text only or transmitted to a headset worn by the user.

Knowledge of the user's mission/role can be used to predict possible information needs. In other words, the content management indexing and searching module 105 can use knowledge of mission (e.g. authoritative data products derived by the military decision making process), user personal information, as well as the user's predicted trajectories to develop search requests of the user information database 150 for relevant information. For instance, in a military decision making process, course of action analyses can be run to identify various 'areas of interest' (AOI). An AOI is a geospatially and temporally constrained space. Thus, if it appears that the user may be approaching an AOI then it may be appropriate to forward to that user information that made it of interest (e.g., potential rallying point for a militant group, background on the group, etc.). The user information database 150 can contain information regarding the people and places of interest that the user might need to know during a particular mission.

The predictions of the user's trajectory together with the predictions derived from knowledge of the user's mission can be used to develop a set of queries against relevant content (data, information, knowledge) stores. Query results can be compressed, encrypted, and forwarded to the user equipment as determined by the user's predicted trajectory or periodically.

Alert information that requires an immediate response or immediate review by the user can be appropriately tagged. Since there may be more information available in each update than the user may need, a user interface can alert the user with anything thus tagged, based on a level of importance of the user information, or make it locally available for search. A simple interface (e.g. push button) can be automatically constructed from the contents of the update so that it will be easy for the user to search it for information as it is needed.

Knowledge of the user's mission and organization can also be used to determine constraints on the information that the user may be interested in, based on the user mission, role or whatever profile information (e.g., user, person of interest) is available. It is responsible for periodically building, compressing, encrypting, and transmitting information packets to the user equipment. The frequency of updates is based on the user's predicted velocity, the update rate of the underlying data, and the amount of time required to transmit an information packet.

A streamlined user interface can be generated on the user equipment 100 display to provide the user with a current situation display that may be built from many pieces of disparate information contained in the most recently transmitted packet. The user interface can also include information from the user equipment memory. Simple mechanisms to drill down on an aspect of the situation, ignore aspects of the situation, and ask for more information will automatically be presented to the user. One benefit of the user interface is to reduce interaction by the user (e.g., typing, application initiation) in order to improve response time and reduce the need to look up related information using distinct interactions.

Figure 3:
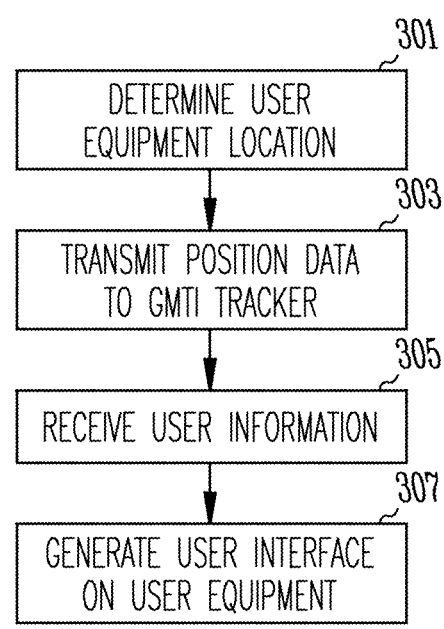
FIG. 3 illustrates a flowchart of an embodiment of a method for operation of the user equipment in accordance with the system of FIG. 1.

FIG. 3 illustrates a flowchart of an embodiment for operation of user equipment in accordance with the system of FIG. 1. The user equipment can automatically determine its current geographical location 301 without interaction by the user. As previously described, the position data can be generated by a GPS receiver or some other mechanism. The location might be determined with a relatively high degree of accuracy (e.g., <3 meters), estimated based on a past location and current trajectory, or estimated based on triangulation with fixed base stations.

The position data is transmitted to the GMTI Tracker module 303. The position data can be encrypted prior to transmission from the user equipment.

The user equipment can then receive the user information 305 from the content management indexing and searching module. This information may have been encrypted and/or compressed prior to transmission so the user equipment would decrypt and/or decompress the data prior to use. The content management indexing and searching module may be aware of information products already stored in the user equipment memory (e.g., images, video clips) and, thus, not include them in the current information packet to reduce the transmission bandwidth.

The user interface can then be generated 307 based on the received user information and/or any relevant information already stored in the user equipment memory. The user interface may not use any standard template but can be generated based on what type of data is received and/or desired by the user based on a predicted location. A streamlined user interface can make it easy for a user to pull up needed information and to drill down on information products while remaining covert and/or engaged with mission.

Figure 4:
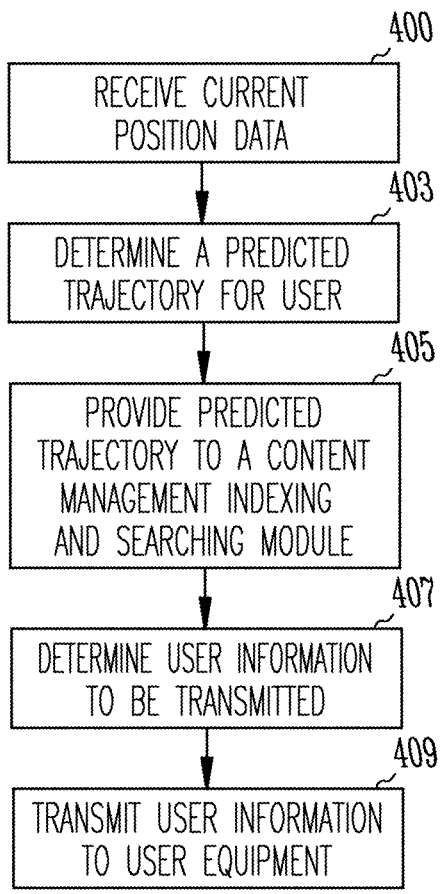
FIG. 4 illustrates a flowchart of an embodiment of a method for predictive transmission of information in accordance with the system of FIG. 1.

FIG. 4 illustrates a flowchart of an embodiment of a method for predictive transmission of information in accordance with the system of FIG. 1. The GMTI tracker module receives the current position data (e.g., estimate) from the user equipment 400. The position data may have been encrypted by the user equipment and, thus, should be decrypted prior to use by the GMTI tracker module.

The GMTI tracker module can then generate a predicted trajectory for the user 403 based on the position data. GMTI kinematic analysis techniques can be used to predict likely user trajectories (where is the user going and when will they get there) using a plurality of received position data messages from the user equipment.

The predicted trajectory can then be provided to the content management indexing and searching module 405 for further processing. The content management indexing and searching module can use the predicted trajectory in combination with the mission/role database in order to search the user information database for appropriate user information to be transmitted 407 to the user equipment. This user information is then transmitted to the user equipment 409. Prior to transmission, the user information can be optionally compressed and/or encrypted.

Tactical users using user equipment that depend on Disconnected, Intermittent, and Limited (DIL) communications networks often need to look up information or need to be alerted by information. Because such users are typically on the move, in austere environments, and/or trying to remain covert, it may be difficult for them to request needed information. Furthermore, network limitations may make it difficult to distribute to them the information they need.

The embodiments of predictive information transmission can provide multiple benefits. Conventionally, commercial cell phone service providers provide location-based information to users through map-based applications. Conventionally, security-based applications may provide alert information based on position of user. Since there is no attempt to predict a user's needs or future position or to exploit knowledge of their mission, the information provided is often of limited value and no pre-positioning of information is possible. Thus, if the user is in an area with no communication, there is no way to get them the information. Furthermore, the user usually has to speak into the device or spend a lot of time interacting with the device to pull up the information, thus making it difficult to remain covert or to perform other tasks.

The present embodiments are predictive and adaptive making it more likely that the user will get information they need despite relying on DIL communications networks. The present embodiments may lend themselves to encoding and encryption to reduce needed bandwidth and increase security. For high value operations, the user's handler can be forwarded the same information so that they can best support the user during the operation. The predictive aspect of some embodiments may lend itself to other applications where a user needs information at his fingertips during a time-sensitive operation.

Some embodiments are useful in other domains. While optimized for 'on the move' missions, a user might find the application useful for desk-based tasks. For instance, information updates could be based more on schedule/mission than position, even if the position is not changing.

Some embodiments provide a mobile application that has fully integrated a highly functional ground moving target tracking algorithm. Some embodiments provide a concept of user mission and role to predictively preposition relevant information on the user equipment (e.g., handheld device). Some embodiments include the building of integrated user information displays from disparate underlying data automatically and not depend on predefined displays (e.g. links to web pages) or highly-templated displays. Some embodiments focus on reduced interaction between cloud-based servers and the user equipment, which slow down interaction, while the user is seeking information.

Embodiments may be implemented in one or a combination of hardware, firmware, or software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

What is claimed is:

1. A system comprising:
   a user device associated with a user and comprising:
      a global positioning system receiver to determine a position estimate of the user device; and
      a user interface comprising a display screen to display a current situation display generated from the position estimate;
   a ground moving target indicator (GMTI) tracker module positioned remote from the user device, the GMTI tracker module adapted to receive a current position estimate from the user device, and to generate future position and velocity estimates for the user device; and
   a database system remote from the GMTI tracker module and in communication with the GMTI tracker module and the user device and comprising a mission/role database and user information database, wherein the database system is adapted to:
      receive the future position and velocity estimates from the GMTI tracker module;
      select user information from one or more of the mission/role database and the user information database based on: the future position and velocity estimates, a mission associated with the user, and a role associated with the user for the mission; and
      transmit the selected user information to the user device for display on the display screen of the user interface.

2. The system of claim 1 wherein the user device comprises one of a mobile telephone, a radio, a tablet computer, a laptop computer, or a desktop computer.

3. The system of claim 1 wherein the user interface is adapted to present tagged user information based on a level of importance of the user information.

4. The system of claim 1 wherein the mission/role database stores mission data and personal information of the user.

5. The system of claim 4 wherein the user information database stores information regarding one or more of people, events, and places of interest based on one or more of the mission associated with the user and the role associated with the user.

6. The system of claim 1 wherein the database system comprises an encryption/compression module to encrypt and compress the user information prior to transmission to the user device.

7. A method for predictive transmission of user information, the method comprising:
receiving, by a ground moving target indicator (GMTI) tracker module from a user device associated with a user and positioned remote from the GMTI tracker module, a current position data of the user device, wherein the user device comprises:
a global positioning system receiver to determine the position estimate; and
a user interface comprising a display screen to display a current situation display generated from the received user information;
determining, by the GMTI tracker module, a predicted trajectory for the user device based on the received current position data;
transmitting, by the GMTI tracker module, the predicted trajectory to a database system remote from the GMTI tracker module;
selecting, by the database system, user information based on: the predicted trajectory, a mission associated with the user, and a role associated with the user for the mission; and
transmitting the selected user information to the user device for display via the display screen of the user interface.

8. The method of claim 7 wherein receiving the current position data of the user device comprises receiving encrypted current position data, the method further comprising:
decrypting the received encrypted current position data prior to determining the predicted trajectory for the user device.

9. The method of claim 7 further comprising:
encrypting the selected user information prior to transmitting the selected user information to the user device.

10. The method of claim 7 further comprising:
accessing a mission/role database of the database system to retrieve personal data regarding the user; and
generating a search request of a user information database of the database system, based on the personal data, the mission of the user, the role of the user, and the predicted trajectory, to select the user information.

11. The method of claim 7 further comprising presenting the selected user information via the user device based on the predicted trajectory, wherein the selected user information is presented via one or more of: a voice connection, text, and a command to perform text-to-speech conversion.

12. A non-transitory computer-readable medium storing instructions that, when executed by a system comprising a ground moving target indicator (GMTI) tracker module and a database system remote from the GMTI tracker module, cause the system to:
receive, by the GMTI tracker module, from a user device associated with a user and positioned remote from the GMTI tracker module, a current position data of the user device, wherein the user device comprises:
a global positioning system receiver to determine the position estimate; and
a user interface comprising a display screen to display a current situation display generated from the received user information;
determine, by the GMTI tracker module, a predicted trajectory for the user device based on the received current position data;
transmit, by the GMTI tracker module, the predicted trajectory to the database system;
select, by the database system, user information based on: the predicted trajectory, a mission associated with the user, and a role associated with the user for the mission; and
transmit the selected user information to the user device for display via the display screen of the user interface.

\* \* \* \* \*